(12) United States Patent
Blaes et al.

(10) Patent No.: US 11,915,436 B1
(45) Date of Patent: Feb. 27, 2024

(54) SYSTEM FOR ALIGNING SENSOR DATA WITH MAPS COMPRISING COVARIANCES

(71) Applicant: Zoox, Inc., Foster City, CA (US)

(72) Inventors: Patrick Blaes, Redwood City, CA (US); Michael Carsten Bosse, Cupertino, CA (US); Elena Stephanie Stumm, San Francisco, CA (US); Derek Adams, Pasadena, CA (US); Brice Rebsamen, Aix-en-Provence (FR)

(73) Assignee: ZOOX, INC., Foster City, CA (US)

( * ) Notice: Subject to any disclaimer, the term of this patent is extended or adjusted under 35 U.S.C. 154(b) by 214 days.

(21) Appl. No.: 17/446,344

(22) Filed: Aug. 30, 2021

(51) Int. Cl.
*G06T 7/33* (2017.01)
*G06T 3/20* (2006.01)
*G06T 3/60* (2006.01)

(52) U.S. Cl.
CPC ............ *G06T 7/337* (2017.01); *G06T 3/20* (2013.01); *G06T 3/60* (2013.01); *G06T 2207/20221* (2013.01); *G06T 2207/20224* (2013.01)

(58) Field of Classification Search
CPC . G06T 2207/10028; G06T 2207/30252; G06T 15/08; G06T 19/00; G06T 17/00; G06T 2210/36; G06T 2207/10044; G06T 2200/04; G06T 7/337; G06T 3/20; G06T 3/60; G06T 2207/20221; G06T 2207/20224; G01S 17/89; G01S 17/86; G01S 7/4808; G01S 7/4972; G01S 13/865; G01S 7/497; G06V 20/56; G06V 20/64; G06V 10/803; G06V 10/811; G05D 2201/0213; G05D 1/0257
See application file for complete search history.

(56) References Cited

U.S. PATENT DOCUMENTS

| | | | |
|---|---|---|---|
| 9,600,929 B1* | 3/2017 | Young | G06T 17/00 |
| 11,227,401 B1* | 1/2022 | Mahieu | G01S 17/89 |
| 2018/0188043 A1* | 7/2018 | Chen | G06V 20/58 |
| 2018/0364717 A1* | 12/2018 | Douillard | G01S 17/58 |
| 2019/0049242 A1* | 2/2019 | Adams | G01B 21/16 |
| 2019/0049566 A1* | 2/2019 | Adams | G01C 25/00 |
| 2019/0258737 A1* | 8/2019 | Wang | G01C 21/3848 |
| 2019/0272665 A1* | 9/2019 | X | G06T 15/08 |
| 2020/0043186 A1* | 2/2020 | Selviah | G06T 7/33 |
| 2020/0110158 A1* | 4/2020 | Ecins | G05D 1/024 |
| 2020/0175726 A1* | 6/2020 | Kuma | H04N 19/46 |
| 2020/0175744 A1* | 6/2020 | Rosenzweig | G06V 20/56 |
| 2020/0184718 A1* | 6/2020 | Chiu | G06T 7/20 |
| 2020/0217666 A1* | 7/2020 | Zhang | G01C 21/1656 |
| 2020/0249353 A1* | 8/2020 | Di Cicco | G01S 17/89 |
| 2020/0271454 A1* | 8/2020 | Kato | G09B 29/106 |
| 2020/0284590 A1* | 9/2020 | Chen | G01C 21/3841 |
| 2020/0394410 A1* | 12/2020 | Zhang | G01C 21/1656 |
| 2020/0408887 A1* | 12/2020 | Zeng | G01S 17/87 |
| 2021/0063200 A1* | 3/2021 | Kroepfl | G01C 21/3896 |
| 2021/0157316 A1* | 5/2021 | Liu | G01C 21/3676 |

(Continued)

*Primary Examiner* — Ian L Lemieux
*Assistant Examiner* — Woo C Rhim
(74) *Attorney, Agent, or Firm* — Lee & Hayes P.C.

(57) ABSTRACT

Techniques for integrating sensor data into a scene or map based on statistical data of captured environmental data are discussed herein. The data may be stored as a multi-resolution voxel space and the techniques may comprise first applying a pre-alignment or localization technique prior to fully integrating the sensor data.

20 Claims, 4 Drawing Sheets

(56) References Cited

U.S. PATENT DOCUMENTS

| | | | |
|---|---|---|---|
| 2021/0183139 A1* | 6/2021 | Richert | G06T 15/30 |
| 2021/0192689 A1* | 6/2021 | Bosse | G06F 18/2135 |
| 2021/0192840 A1* | 6/2021 | Bosse | G06T 17/05 |
| 2021/0192841 A1* | 6/2021 | Hu | G05D 1/0088 |
| 2021/0323572 A1* | 10/2021 | He | G01S 7/4808 |
| 2021/0327128 A1* | 10/2021 | Yu | G01S 7/4808 |
| 2021/0334988 A1* | 10/2021 | Xiao | G01S 17/931 |
| 2021/0350147 A1* | 11/2021 | Yuan | G01C 21/3837 |
| 2021/0370968 A1* | 12/2021 | Xiao | G01S 17/86 |
| 2021/0406559 A1* | 12/2021 | Efland | G06V 10/803 |
| 2022/0012916 A1* | 1/2022 | Srinivasan | G06V 20/58 |
| 2022/0137227 A1* | 5/2022 | Armstrong-Crews | B60W 30/09 701/26 |
| 2022/0179056 A1* | 6/2022 | Braley | G01S 17/87 |
| 2022/0270268 A1* | 8/2022 | Radha | G06T 7/248 |
| 2022/0292699 A1* | 9/2022 | Zhu | G06T 7/593 |
| 2022/0358733 A1* | 11/2022 | Velasquez | G06F 3/011 |
| 2022/0405536 A1* | 12/2022 | Püskül | G06F 18/217 |
| 2023/0130320 A1* | 4/2023 | Zhang | G01S 17/66 356/5.01 |

* cited by examiner

SYSTEM FOR ALIGNING SENSOR DATA WITH MAPS COMPRISING COVARIANCES

BACKGROUND

Data can be captured in an environment and represented as a map of the environment. Often, such maps can be used by vehicles navigating within the environment, although the maps can be used for a variety of purposes. In some cases, an environment can be represented as a two-dimensional map, while in other cases, the environment can be represented as a three-dimensional map. These maps are often combined and updated to incorporate newly captured sensor data which can be time consuming and processing resource intensive. Additionally, some map formats may produce better results when used for certain tasks (e.g., as compared to other map formats) while producing worse results for other tasks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Autonomous vehicles may navigate through physical environments along planned routes or paths. For example, when an autonomous vehicle receives a request to travel to a destination location, the autonomous vehicle may navigate along a planned trajectory from the current location of the autonomous vehicle to a pickup location to pick up a passenger and then from the pickup location to the destination location. The planned trajectory is often determined using map data representative of the physical environment. The map data is kept current by updating the sensor data (such as point cloud data representative of a physical environment) captured by the autonomous vehicle while the autonomous vehicle traverses the planned trajectory. However, integrating the sensor data into the map data and/or combining multiple spins or sets of sensor data is time consuming and resource intensive.

As one example, map data may be stored as a multi-resolution voxel space comprising voxels having spatial means, covariances, and weights of point distributions of data representative of a physical environment. The map data may comprise a plurality of voxel grids or layers representing the physical environment at different resolutions or physical distances. Data associated with voxels of the multi-resolution voxel space may be represented as a plurality of covariance ellipsoids. The covariance ellipsoid representation may be generated based on calculated mean and covariance value of data points associated with individual voxels. In some cases, voxel data can be associated with semantic information such as classification and/or segmentation information, and data associated with a specific classification can be associated with a particular multi-resolution voxel space. In this example, a voxel covariance semantic layer may comprise data points associated with a particular semantic class (e.g., tree, vehicle, building, etc.) as covariance ellipsoid.

In some cases, map data represented by a multi-resolution voxel space may be generated from data points representing a physical environment, such as a point cloud data and/or an output of a light detection and ranging (lidar) system. For instance, the system may receive a plurality of lidar points or lidar data represented as a point cloud. The system may assign or otherwise associate the lidar points to voxels of a voxel grid. The system may determine statistical data associated with individual voxel, such as a mean, centroid, covariance, and the like of the accumulated data. The system may then merge or otherwise combine voxels. For example, voxels (or data associated with the voxels) within a three-dimensional neighborhood (e.g., a number of voxels in the x, y, and z direction that are associated with the physical space) may be merged.

In one specific example, the voxels within the neighborhood are merged by taking a weighted sum of the individual Gaussian distributions of a voxel within the neighborhood. In some cases, merging voxels within a neighborhood is computationally inexpensive but can, in some cases, require localization of newly received point cloud data with a local reference frame (e.g., when merging sensor data into an existing voxel space or merging two voxel spaces). For instance, when the two voxel spaces have little overlap, merging the voxel spaces based on covariances may be time and resource intensive.

Accordingly, in some implementations, the system, discussed herein, may apply a search (such as an anxious search) that generates a first data product having a first type prior to merging two voxel spaces using the voxel covariances that generates a second data product having a second type. In this manner, the voxel spaces may be localized to a shared reference frame using the search and the overlap between the voxel spaces may be increased to meet or exceed a threshold (such as a distance threshold) prior to merging via voxel covariances and neighborhoods. By ensuring sufficient overlap and localization between the voxel spaces, the overall processing resources and time associated with merging the voxel spaces may be substantially reduced. For example, the search may be better capable of converging. However, as the data converges the resources required to process individual iterations of the search increases, often requiring large amounts of computational resources to complete. Alternatively, merging voxel covariances may be resource efficient and provides more accurate and efficient localization within the data set but the voxel covariances may struggle with initial convergence.

In some implementations, the search may assign a residual value to individual voxel granted from the captured point cloud or lidar data. The residual values may be a smallest eigenvalue that may be computed as the distance between an average position to a plane associated with the voxel. In some cases, the system may determine a transform (i.e. one or more of a translation or a rotation) to apply to the data to minimize the total residual of the voxels when the data is projected into the voxel space. The total residual may be utilized to compute an occupancy or voxel score. The system may then align a first voxel of the first voxel space with a second voxel of the second voxel space using the voxel scores (such as when the voxel scores substantially match—e.g., meet or exceed one or more thresholds).

In some implementations, the search may continue to iterate and determine translations, residuals and voxel scores, until the first and second voxel spaces are within one or more thresholds (such as one or more distance thresholds) of one another. In this manner, the search may perform a high level or coarse alignment or localization between two voxel spaces.

Once localized, the alignment may continue as the system identifies correspondences between voxels of a voxel space. In some cases, as discussed above, the voxel space may include multiple resolutions or layers that may be aligned based on detected correspondences at each resolution substantially simultaneously. For example, the system may, for each voxel of a particular resolution, search among voxels within a threshold distance or within a threshold number of voxels (e.g., a neighborhood of voxels) containing a mean target point in a corresponding particular resolution of the reference multi-resolution voxel space for occupied voxels. In examples including semantic layers, the system may, for individual voxel of the particular resolution of individual semantic layer in the target multi-resolution voxel space, search the neighborhood of voxels containing the mean target point in the particular resolution of the corresponding semantic layer in the reference multi-resolution voxel space.

Of the voxels identified within the neighborhood, the system may select the voxel having a centroid closet to the voxel of the target voxel space. The system may then average the distributions of the selected voxel in the reference voxel space with the voxel of the target covariance stack. Next, the system may perform principal component analysis on the combined covariance matrix and select an eigenvalue (e.g., a smallest eigenvalue) as a matched normal vector for the two voxels. The system may determine a residual for the matched voxels which, in at least some examples, may be based at least in part on such matched normal vector, and subsequently perform an optimization over all such residuals. The optimization may minimize a distance between pairs of such voxel centroids. In this manner, a merged voxel representing the two voxels may be located within the voxel space or grid at a position that accurately represents the covariances (e.g., of the associated data) and weights of both of the original voxels. The data may then be stored as a voxel covariance map or a multi-resolution voxel covariance map.

The system, discussed herein, improves the overall convergence rate and speed while reducing the overall resource consumption associated with integrating sensor data into map based or geographic representations of a physical environment.

Although examples are described in the context of autonomous vehicles, the techniques described herein are not limited to use with autonomous vehicles and may be used to localize, align, and merge map data and/or sensor data in other contexts, such as landscaping, design, manufacturing, video games, etc.

Figure 1:
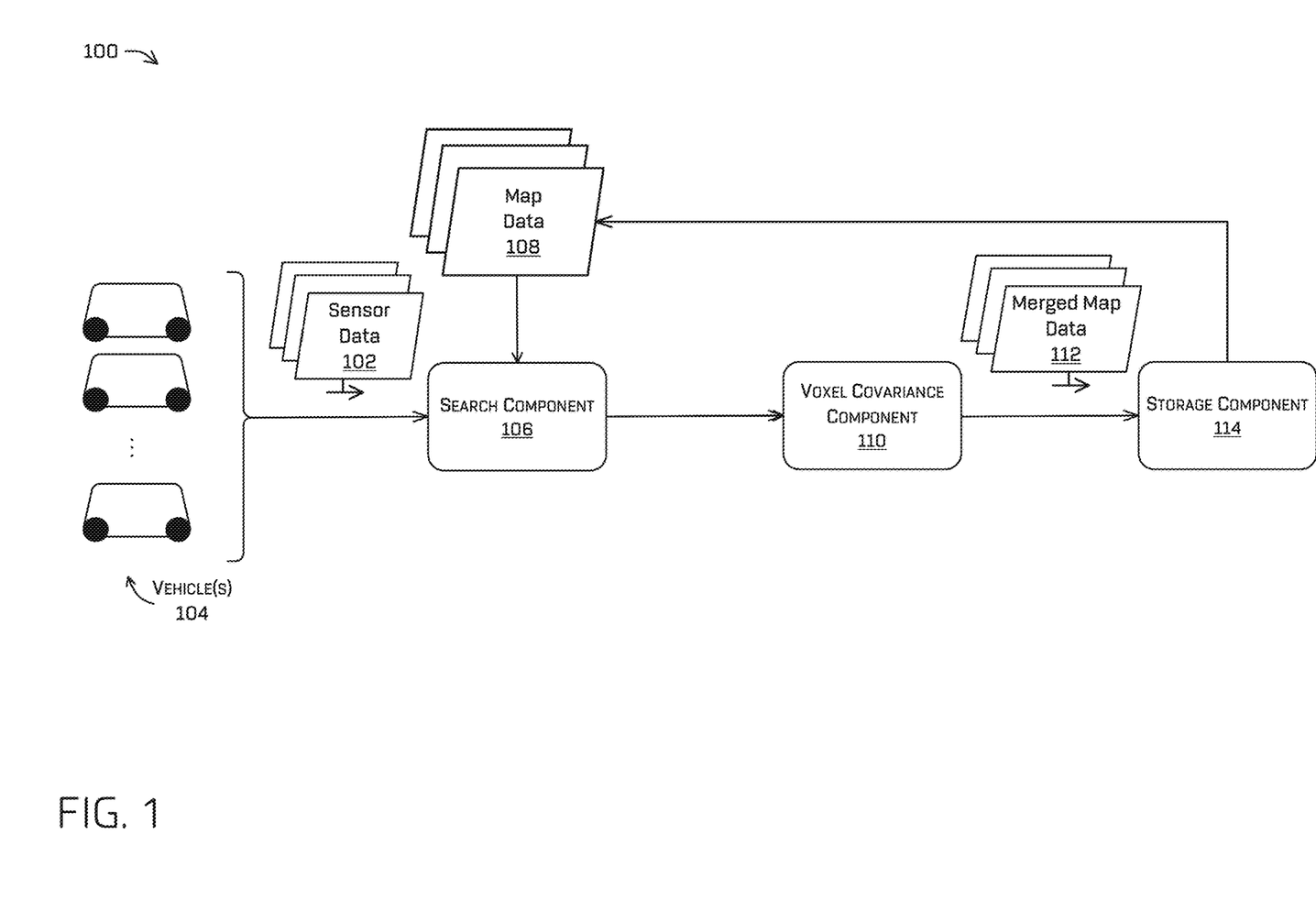
FIG. 1 is an example block-diagram illustrating an example architecture of a data alignment system, in accordance with implementations of the disclosure.

FIG. 1 is an example block-diagram illustrating an example architecture of a data alignment system 100, in accordance with implementations of the disclosure. As discussed above, sensor data 102 may be received from one or more vehicles 104 or other systems at a search component 106. The senor data 102 may include point cloud representations of physical environments traversed by the vehicles 104 (e.g., lidar data, radar data, depth data from multi-view geometry, structed light, etc.).

The search component 106 may also receive map data 108 that may be represented as a target voxel space (such as a multi-resolution voxel space) into which the sensor data 102 is being incorporated. In some cases, the search component 106 may iteratively determine transforms (e.g., one or more of a translation and/or a rotation) to apply to the sensor data 102 to minimize a total residual of the voxels when the sensor data 102 is projected into the target voxel space associated with the map data 108. For instance, the search component 106 may apply different transforms to the sensor data 102, project the transformed sensor data into the target voxel space associated with the map data 108, and recalculate the residual values of the projection based on the new (assumed) pose. The search component 106 may then continue to perturb and/or iterate transforms until a pre-defined threshold differential in the residual values is met or exceeded such that an overlap between the voxel spaces is achieved. In other cases, the pre-defined threshold may be defined in terms of distances, spatial means, and/or covariances between the target voxel space of the map data 108 and the projected voxels of the sensor data 102.

In some examples, the search component 106 may perform at different resolutions of a multi-resolution voxel space. For instance, the search component 106 may first align the sensor data 102 with the map data 108 at a coarse or high level resolution. Once the data 102 and 108 is aligned at a higher resolution, the search component 106 may reduce to a finer or lower resolution and again determining transforms associated with the sensor data 102 at the new reduced voxel size, projecting the transformed sensor data into the target voxel space associated with the map data 108, and recalculating the residual values of the projection based on the new poses. The search component 106 may continue to reduce the voxel size and continue alignment until a resolution, size, or distance threshold is met or exceed.

Once the first voxel space associated with the transformed sensor data 102 and the target voxel space associated with the map data 108 are aligned or localized at a desired resolution, distance, coarseness, or the like, the data (e.g., the first voxel space and the target voxel space) may be provided to and received by a voxel covariance component 110. The voxel covariance component 110 may continue to merge or align the sensor data 102 with the map data 108. For example, to further align the first voxel of the sensor data 102 with the target voxels of the map data 108, the multi-resolution covariance component 110 may, substantially simultaneously for individual layers (e.g., semantic layer) and/or individual resolutions, select a pair of voxels (e.g., one from the first voxel space and a second from the target voxel space) and determine a mean target point. The voxel covariance component 110 may then determine a neighborhood of the voxel space based on the mean target point and identify if any voxels of the neighborhood are occupied. The covariance component 110 then selects an occupied voxel of the first voxel space having a centroid closest to the voxel from the target voxel space and average the distributions of the two voxels (e.g., the selected and target). The covariance component 110 may then perform principal component analysis on the combined covariance matrix of the two voxels and select a smallest eigenvalue as a matched normal vector, thereby causing the first voxel space associated with the senor data 102 to more closely align with the target voxel space associated with the map data 108.

The covariance component 110 may continue to iterate after individual adjustments until the voxels of the voxel space are within a tolerance (such as a predetermined threshold distance, covariance, or the like) or a predetermined number of iterations are complete. In some cases, using a multi-resolution voxel space, the covariance component 110 may align coarser resolutions prior to identifying matches of finer resolutions.

The combined voxels may then represent the sensor data 102 integrated into the map data 108, which may be stored as merged map data 112 at a storage component 114. The process may then repeat with the merged map data 112 acting as the map data 108 as additional sensor data 102 is received from the vehicles 104. In some cases, the merged map data 112 may then be utilized by one or more systems (such as one or more autonomous vehicles) to localize and/or a tack position within the represented physical environment (e.g., by implementing a simultaneous location and mapping process).

Figure 2:
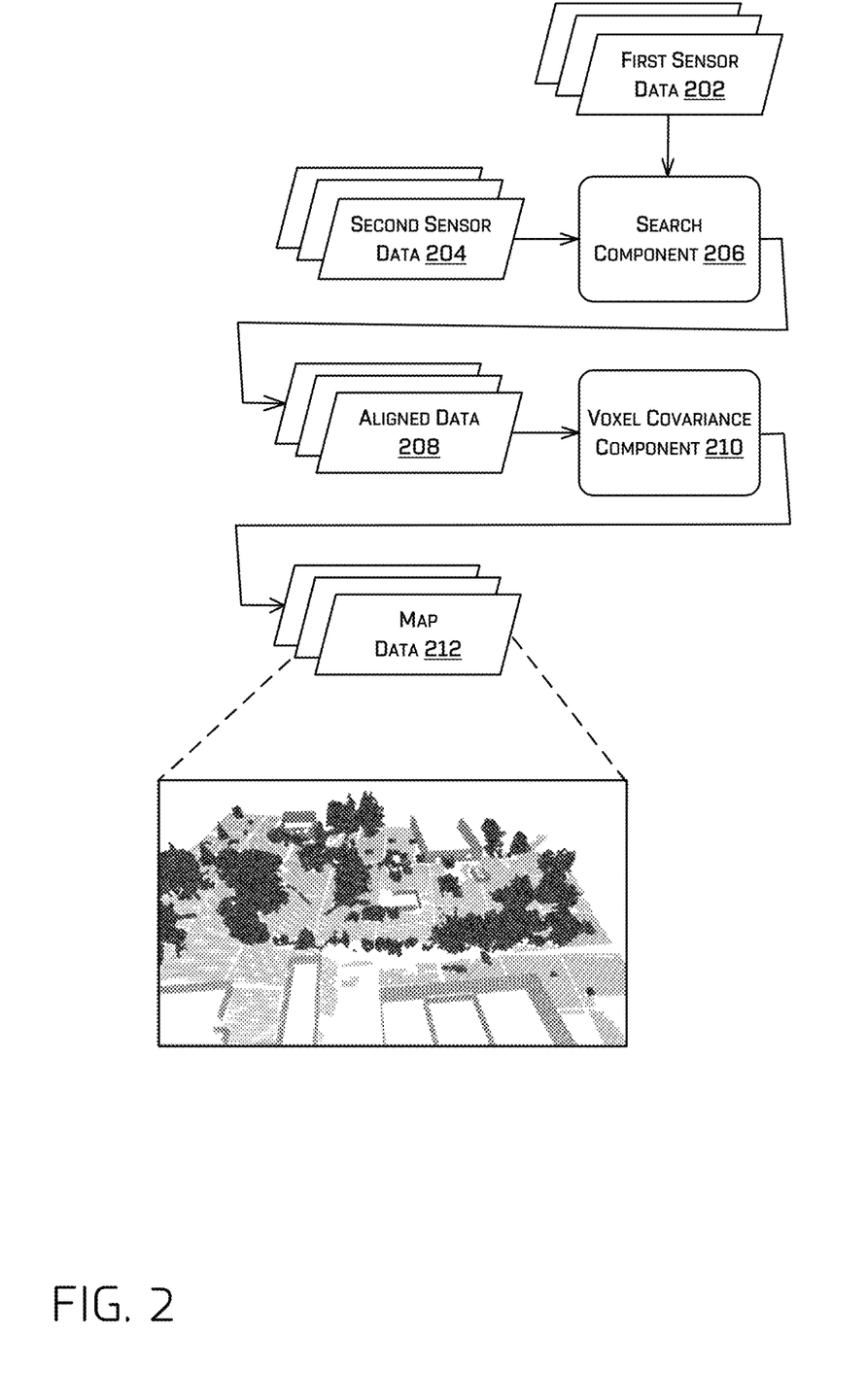
FIG. 2 illustrates another example block-diagram illustrating an example architecture of a data alignment system, in accordance with implementations of the disclosure.

FIG. 2 illustrates another example block-diagram illustrating an example architecture of a data alignment system 200, in accordance with implementations of the disclosure. In some examples, the data alignment system 200 may receive a first sensor data 202 and second sensor data 204 (such as a first and second point cloud or first and second spin of a lidar sensor associated with the capturing vehicles). In this example, the second sensor data 204 may be merged with the first sensor data 202 in lieu of map data 108 of FIG. 1. For instance, the data alignment system 200 may be combining the first sensor data 202 and second sensor data 204 into a single voxel space for use by an autonomous vehicle in making operational decisions.

In the illustrated example, the search component 206 may receive both the first sensor data 202 and the second sensor data 204. The search 206 may again attempt to localize or align the first sensor data 202 and the second sensor data 204 in voxel space prior to sending the aligned data 208 to the voxel covariance component 210, as discussed above. In this example, the search component 206 may apply one or more transformations to the first sensor data 202 and the second sensor data 204 such that both sets of data 202 and 204 may be adjusted to align within the voxel space. The search component 206 may then determine the residual values of the projected voxels associated with both the first sensor data 202 and the second sensor data 204 until the pre-defined threshold in the residual values is met.

The voxel covariance component 210 continues to merge or align the first sensor data 202 and the second sensor data 204, as discussed above. For example, to further align the first sensor data 202 and the second sensor data 204, the voxel covariance component 210 may identify pairs of neighboring voxels and generate a combined voxel having a merged covariance matrix. The covariance component 210 may continue to identify pairs and merge the voxels until the voxels meet or exceed a threshold tolerance or a predetermined number of iterations are complete. The data alignment system 200 may then output map data 212 as a collection of voxels. In some cases, the map data 212 may include a multi-resolution or multi-layer voxel space, wherein a voxel in the space comprises a measure of distance and/or combined covariance matrixes.

Figure 3:
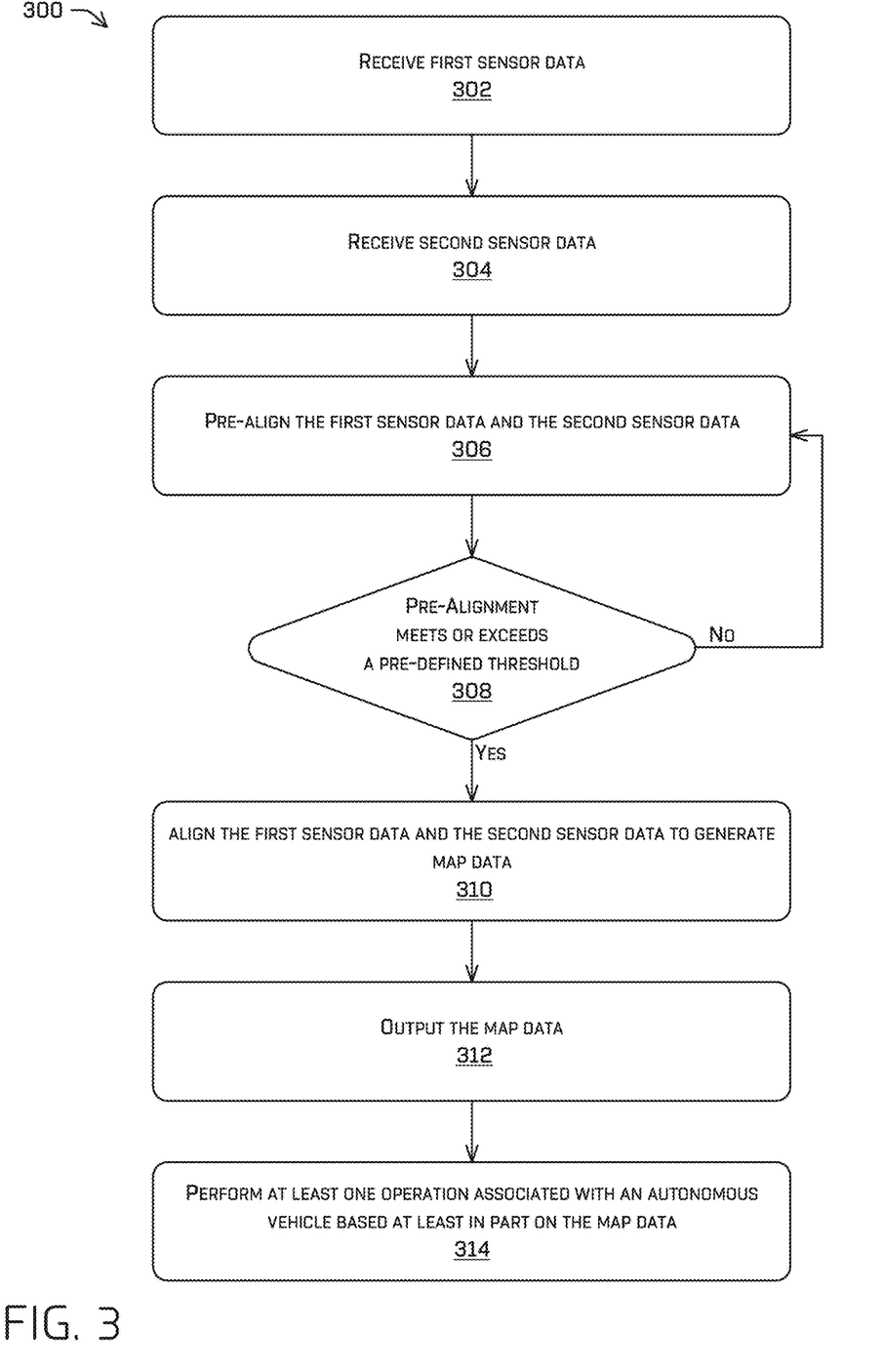
FIG. 3 is a flow diagram illustrating an example process associated with the data alignment system, in accordance with implementations of the disclosure.

FIG. 3 is a flow diagram illustrating example processes associated with the data alignment system discussed herein. The processes are illustrated as a collection of blocks in a logical flow diagram, which represent a sequence of operations, some or all of which can be implemented in hardware, software, or a combination thereof In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process 300 associated with the data alignment system, in accordance with implementations of the disclosure. As discussed herein, a data alignment system may align sensor data representative of a physical environment with an existing map data of the physical environment and/or additional sensor data of the physical environment.

At 302, the data alignment system may receive first sensor data. As discussed above, the first sensor data may be lidar data, radar data, or other point cloud data associated with and/or representing a physical environment and generated and/or captured during a first period of time. For example, an autonomous vehicle may collect the first sensor data as the vehicle traverses through the physical environment along a preplanned trajectory or route.

At 304, the data alignment system may receive second sensor data. The second sensor data may be lidar data, radar data, or other point cloud data associated with and/or representing a physical environment and generated and/or captured during a second period of time. Again, the autonomous vehicle may collect the second sensor data as the vehicle traverses through the physical environment along the preplanned trajectory or route.

At 306, the data alignment system may pre-align the first sensor data and the second sensor data. The pre-alignment may include aligning the first sensor data and the second sensor data within a voxel space using a first search component and/or technique. Details of associated with the first search are discussed in U.S. Pat. No. 10,983,199, which is herein incorporated by reference in its entirety for all purposes.

At 308, the data alignment system may determine if the pre-alignment meets or exceeds a pre-defined threshold (such as a convergence threshold). For example, the search component may perturb or iterate through transforms applied to the first sensor data and/or the second sensor data and project the transformed data into voxel space until the pre-defined threshold in the residual values is met. For example, the data alignment system may iterate until convergence is less than or equal to a distance threshold, a number of iterations or levels are performed, and/or a change in the residual between the prior iteration and the current iteration is less than or equal to a residual threshold. Once the pre-defined threshold is met or exceeded, the process 300 may advance to 310.

At 310, the data alignment system may continue to align the first sensor data and the second sensor data to generate map data. For example, the data alignment system may merge the first sensor data and the second sensor data in voxel space at various resolutions based on pre-defined voxel distance per resolution. In some cases, the voxels may be merged by generating a combined voxel covariance matrix. The voxel covariance alignment may continue until a second pre-defined criteria or threshold is met (e.g., a distance threshold, a iterations threshold, a residual threshold, or the like). Details of associated with merging voxels using voxel covariances are discussed in U.S. application Ser. No. 16/722,598, which is herein incorporated by reference in its entirety for all purposes.

At 312, the data alignment system may output the map data. for example, the map data may be output to an autonomous vehicle such as a navigation or perception system associated with segmenting and classifying objects in the physical environment and/or making operational decisions.

At 314, the autonomous vehicle may perform at least one operation based at least in part on the map data. For example, the autonomous vehicle may brake, accelerate, turn, and the like in response to processing the map data.

Figure 4:
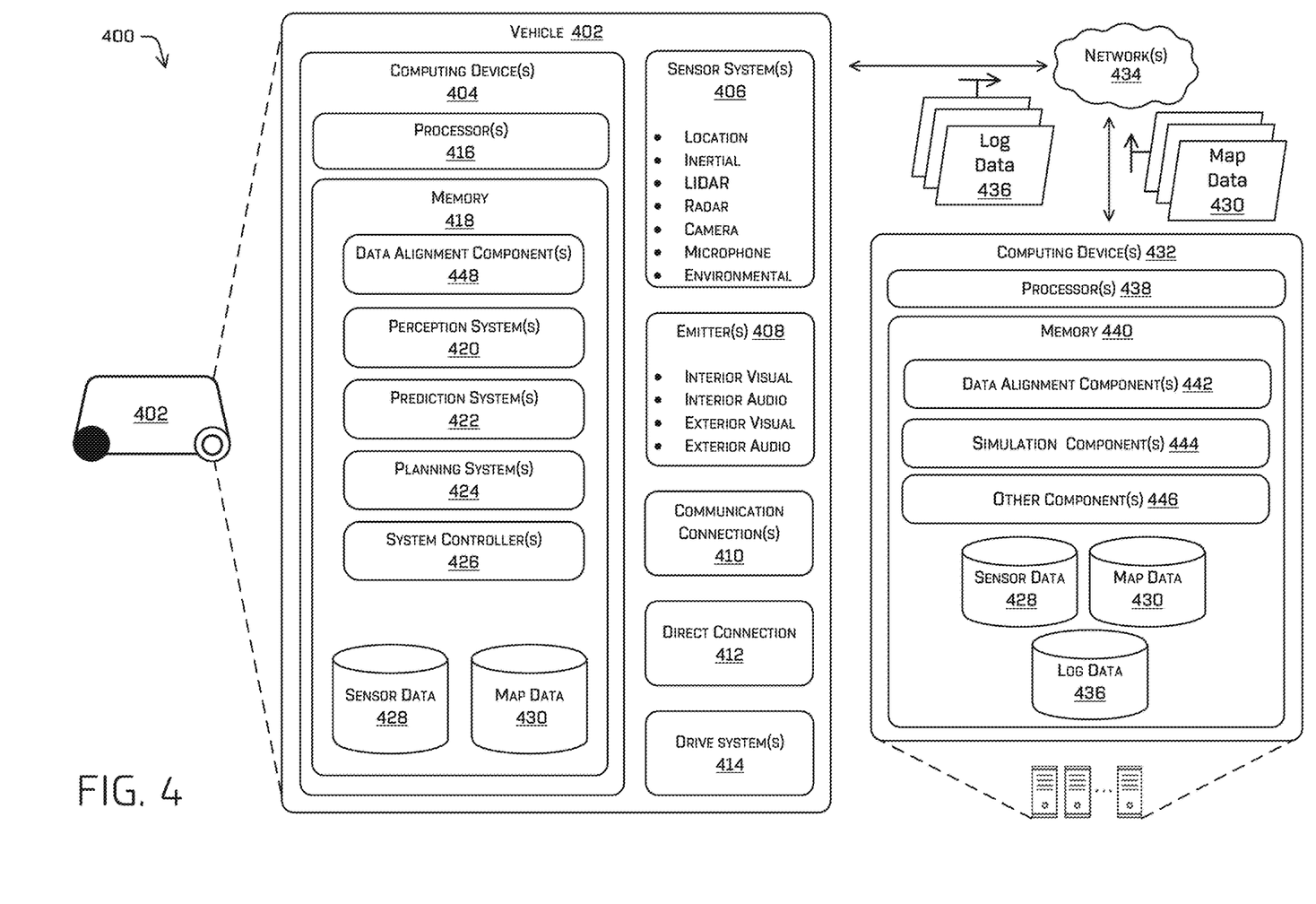
FIG. 4 depicts a block diagram of an example system for implementing the techniques discussed herein.

FIG. 4 depicts a block diagram of an example system 400 for implementing the techniques discussed herein. In at least one example, the system 400 may include a vehicle 402, such the autonomous vehicles discussed above. The vehicle 402 may include computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 may be configured to capture the sensor data 428 associated with a surrounding physical environment.

In at least some examples, the sensor system(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 406 may include multiple instances of individual type of sensors. For instance, time-of-flight sensors may include individual time-of-flight sensors located at the corners, front, back, sides, and/or top of the vehicle 402. As another example, camera sensors may include multiple cameras disposed at various locations about the exterior and/or interior of the vehicle 402. In some cases, the sensor system(s) 406 may provide input to the computing device(s) 404.

The vehicle 402 may also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enables communication between the vehicle 402 and one or more other local or remote computing device(s) (e.g., a remote teleoperations computing device) or remote services. For instance, the communication connection(s) 410 can facilitate communication with other local computing device(s) on the vehicle 402 and/or the drive system(s) 414. Also, the communication connection(s) 410 may allow the vehicle 402 to communicate with other nearby computing device(s) (e.g., other nearby vehicles, traffic signals, etc.).

The communications connection(s) 410 may include physical and/or logical interfaces for connecting the computing device(s) 404 to another computing device or one or more external network(s) 434 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2 G, 3 G, 4 G, 4 G LTE, 5 G, etc.), satellite communication, dedicated short-range communications (DSRC), or any suitable wired or wireless communications protocol that enables the respective computing device to interface with the other computing device(s). In at least some examples, the communication connection(s) 410 may comprise the one or more modems as described in detail above.

In at least one example, the vehicle 402 may include one or more drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which may receive and preprocess data from the sensor system(s) 406 and control operation of the various vehicle systems. In some examples, the drive system controller can include one or more processor(s) and memory communicatively coupled with the one or more processor(s). The memory can store one or more modules to perform various functionalities of the drive system(s) 414. Furthermore, the drive system(s) 414 may also include one or more communication connection(s) that enable communication by the respective drive system with one or more other local or remote computing device(s).

The computing device(s) 404 may include one or more processors 416 and one or more memories 418 communicatively coupled with the processor(s) 416. In the illustrated example, the memory 418 of the computing device(s) 404 stores data alignment components 448, perception system(s) 420, prediction system(s) 422, planning system(s) 424, as well as one or more system controller(s) 426. The memory 418 may also store data such as sensor data 428 captured or collected by the one or more sensors systems 406 and map data 430. Though depicted as residing in the memory 418 for illustrative purposes, it is contemplated that the data alignment components 448, the perception system(s) 420, prediction system(s) 422, planning system(s) 424, as well as one or more system controller(s) 426 may additionally, or alternatively, be accessible to the computing device(s) 404 (e.g., stored in a different component of vehicle 402 and/or be accessible to the vehicle 402 (e.g., stored remotely)).

In some cases, the data alignment component 448 may be configured to align, combine, and/or integrate the sensor data 428 with existing map data 430 as well as to combine individual spins or sets of sensor data 428 together into a representation of the physical environment. As discussed above (e.g., with respect to any of FIGS. 1-3), the data alignment component 448 may utilize a search component to perform an initial alignment and/or localization and then further refine the alignment using voxel covariance matrixes.

The perception system 420 may be configured to perform object detection, segmentation, and/or categorization on the sensor data 428 and/or the map data 430. In some examples, the perception system 420 may generate processed perception data from the sensor data 428. The perception data may indicate a presence of objects that are in physical proximity to the vehicle 402 and/or a classification or type of the objects (e.g., car, pedestrian, cyclist, building, tree, road surface, curb, sidewalk, unknown, etc.). In some cases, the perception data may in integrated into the map data 430 such as via a semantic layer of a multi-resolution voxel space. In additional and/or alternative examples, the perception system 420 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc.

The prediction system 422 may be configured to determine a track corresponding to an object identified by the perception system 420. For example, the prediction system 422 may be configured to predict a velocity, position, change in trajectory, or otherwise predict the decisions and movement of the identified objects. For example, the prediction system 422 may include one or more machine learned models that may, based on inputs such as object type or classification and object characteristics, output predicted characteristics of the object at one or more future points in time.

The planning system 424 may be configured to determine a route for the vehicle 402 to follow to traverse through an environment. For example, the planning system 424 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 424 may determine a route to travel from a first location (e.g., a current location) to a second location (e.g., a target location) in order to avoid an object obstructing or blocking a planned path of the vehicle 402. In some case, a route can be a sequence of waypoints for traveling between the two locations (e.g., the first location and the second location). In some cases, waypoints include streets, intersections, glob al positioning system (GPS) coordinates, etc.

In at least one example, the computing device(s) 404 may store one or more and/or system controllers 426, which may be configured to control steering, propulsion, braking, safety, emitters, communication, and other systems of the vehicle 402. The system controllers 426 may communicate with and/or control corresponding systems of the drive system(s) 414 and/or other components of the vehicle 402, which may be configured to operate in accordance with a route provided from the planning system 424.

In some implementations, the vehicle 402 may connect to computing device(s) 432 via the network(s) 434. For example, the computing device(s) 432 may receive log data 436 from one or more vehicles 402. The log data 436 may include the sensor data 428, perception data, prediction data and/or a combination thereof In some cases, the log data 428 may include portion of one or more of the sensor data 428, perception data, prediction data.

The computing device 432 may include one or more processors 438 and memory 440 communicatively coupled with the one or more processors 438. In at least one instance, the processor(s) 438 may be similar to the processor(s) 416 and the memory 440 may be similar to the memory 418. In the illustrated example, the memory 440 of the computing device(s) 432 stores the log data 436, the sensor data 428, and the map data 430. The memory 440 may also store a data alignment component 442, simulation component 444, as well as other components 446, such as an operating system.

In some cases, the data alignment component 442 may be configured to align, combine, and/or integrate the sensor data 428 with existing map data 430 as well as to combine individual spins or sets of sensor data 428 together into a representation of the physical environment. As discussed above (e.g., with respect to any of FIGS. 1-3), the data alignment component 442 may utilize a search component to perform an initial alignment and/or localization and then further refine the alignment using voxel covariance matrixes.

In some cases, the map data 430 output by the data alignment component 442 may be used by a simulation component 444 in addition to the vehicles 402. The simulation component 444 may generate scenario data using the map data 430 and, using the scenario data, simulate variations of a desired situation to test how an autonomous vehicle may perform (e.g., respond) in the desired situation.

The processor(s) 416 of the computing device(s) 404 and the processor(s) 438 of the computing device(s) 432 may be any suitable processor capable of executing instructions to process data and perform operations as described herein. By way of example and not limitation, the processor(s) 416 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the computing device(s) 404 and the memory 440 of the computing device(s) 432 are examples of non-transitory computer-readable media. The memory 418 and 432 can store an operating system and one or more software applications, instructions, programs, and/or data to implement the methods described herein and the functions attributed to the various systems. In various implementations, the memory 418 and 432 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 418 and 432 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed by any other component. It should also be understood, that components or steps discussed with respect to one example or implementation may be used in conjunction with components or steps of other examples. For example, the components and instructions of FIG. 4 may utilize the processes and flows of FIGS. 1-3.

A non-limiting list of objects or agents may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. An system comprising: A system comprising: one or more processors; and one or more non-transitory computer-readable media storing instructions that, when executed by the one or more processors, cause the one or more processors to perform operations comprising: receiving first sensor data representative of a physical environment; receiving reference data representative of the physical environment, the reference data comprising a voxel space; determining an alignment between the first sensor data with the reference data based at least in part on iteratively: determining, based at least in part on one or more of a translation or a rotation of the first sensor data, transformed data; projecting the transformed data into voxel space; and determining a difference between the transformed data and the reference data; generating merged map data by merging a first voxel associated with the first sensor data and a second voxel associated with the reference data based at least in part on a combined covariance matrix determined based at least in part on a portion of the first sensor data and the reference data; and outputting the merged map data.

B. The system of claim A, wherein aligning the first sensor data with the reference data further comprises: determining the difference is greater than or equal to a threshold, and wherein the reference data comprises one or more of: map data, or second sensor data.

C. The system of claim A, the operations further comprising applying, for individual iterations, a scaling factor to at least one translation or ration.

D. The system of claim C, the operations further comprising determining, for individual iterations, the scaling factor based on a number of the iterations.

E. The system of claim C, the operations further comprising determining, for individual iterations, the scaling factor based on a gaussian distribution associated with the voxel space at a current iteration.

F. The system of claim A, wherein generating merged map data further comprises: determining a neighborhood associated with the second voxel; identifying a set of voxels associated with the sensor data within the neighborhood, the set of voxels including the first voxel; and determining the first voxel to merge with the second voxel based at least in part on the first voxel having a centroid closet to the second voxel in the voxel space.

G. A method comprising: receiving first data representative of a physical environment; receiving second data representative of the physical environment; iteratively (1) determining one or more of a translation or a rotation of the first data and (2) associating, based at least in part on the one or more of the translation or the rotation, the first data with a voxel space associated with the second data, until a threshold is met; generating map data by generating a combined covariance matrix of a first voxel associated with the first data and a second voxel associated with the second data; and outputting the map data.

H. The method of paragraph G, wherein the threshold is associated with at least one of: a magnitude in a change in a residual of a third voxel between a prior iteration and a current iteration; a predetermined physical distance; or a predetermined number of iterations.

I. The method of paragraph G, further comprising determining a location of a system within the physical environment based at least in part on the map data.

J. The method of paragraph G, wherein generating map data further comprises: determining a neighborhood associated with the second voxel; identifying a set of voxels associated with the first data within the neighborhood, the set of voxels including the first voxel; and selecting the first voxel based at least in part on the first voxel having a centroid closet to the second voxel in the voxel space.

K. The method of paragraph J, wherein: the voxel space is a multi-resolution voxel space; and generating map data further comprises combining covariance matrixes of voxels at a coarser resolution prior to combining the covariance matrixes at a finer resolution.

L. The method of paragraph G, further comprising applying, for individual iterations, a scaling factor to at least one of the translation or the rotation.

M. The method of paragraph G, wherein the second data is stored map data.

N. A non-transitory computer-readable medium storing instructions that, when executed, cause one or more processors to perform operations comprising: receiving first data representative of a physical environment; receiving second data representative of the physical environment; iteratively (1) determining one or more of a translation or a rotation of the first data and (2) associating, based at least in part on the one or more of the translation or the rotation, the first data with a voxel space associated with the second data, until a threshold is met; generating map data by generating a combined covariance matrix of a first voxel associated with the first data and a second voxel associated with the second data; and outputting the map data.

O. The non-transitory computer-readable medium of paragraph N, wherein the threshold is associated with at least one of: a magnitude in a change in a residual of a third voxel between a prior iteration and a current iteration; a predetermined physical distance; or a predetermined number of iterations.

P. The non-transitory computer-readable medium of paragraph O, wherein the operations further comprises determining a location of a system within the physical environment based at least in part on the map data.

Q. The non-transitory computer-readable medium of paragraph O, wherein pre-alignment threshold is a distance threshold in voxel space.

R. The non-transitory computer-readable medium of paragraph O, wherein generating map data further comprises: determining a neighborhood associated with the second voxel; identifying a set of voxels associated with the first data within the neighborhood, the set of voxels including the first voxel; and selecting the first voxel based at least in part on the first voxel having a centroid closet to the second voxel in the voxel space.

S. The non-transitory computer-readable medium of paragraph R, wherein: the voxel space is a multi-resolution voxel space; and generating map data further comprises combining covariance matrixes of voxels at a coarser resolution prior to combining the covariance matrixes at a finer resolution.

T. The non-transitory computer-readable medium of paragraph 0, wherein the operations further comprises applying, for individual iterations, a scaling factor to at least one of the translation or the rotation.

While the example clauses described above are described with respect to one particular implementation, it should be understood that, in the context of this document, the content of the example clauses can also be implemented via a method, device, system, a computer-readable medium, and/ or another implementation. Additionally, any of examples A-T may be implemented alone or in combination with any other one or more of the examples A-T.

What is claimed is:

1. A system comprising:
   one or more processors; and
   one or more non-transitory computer-readable media storing instructions that, when executed by the one or more processors, cause the one or more processors to perform operations comprising:
      receiving first sensor data representative of a physical environment;
      receiving reference data representative of the physical environment, the reference data comprising a voxel space;
      determining an alignment between the first sensor data with the reference data based at least in part on iteratively:
         determining, based at least in part on one or more of a translation or a rotation of the first sensor data, transformed data;
         projecting the transformed data into voxel space; and
         determining a difference between the transformed data and
      the reference data;
      generating merged map data by merging a first voxel associated with the first sensor data and a second voxel associated with the reference data based at least in part on a combined covariance matrix determined based at least in part on a portion of the first sensor data and the reference data, wherein generating merged map data comprises:
      determining a neighborhood associated with the second voxel;
      identifying a set of voxels associated with the sensor data within the neighborhood, the
      set of voxels including the first voxel; and
      determining the first voxel to merge with the second voxel based at least in part on the first voxel having a centroid closest to the second voxel in the voxel space; and
      outputting the merged map data.

2. The system as recited in claim 1, wherein aligning the first sensor data with the reference data further comprises:
determining the difference is greater than or equal to a threshold, and
wherein the reference data comprises one or more of:
map data, or
second sensor data.

3. The system as recited in claim 1, the operations further comprising applying, for individual iterations, a scaling factor to at least one translation or rotation.

4. The system as recited in claim 3, further comprising determining, for individual iterations, the scaling factor based on a number of the individual iterations.

5. The system as recited in claim 3, further comprising determining, for individual iterations, the scaling factor based on a gaussian distribution associated with the voxel space at a current iteration.

6. The system as recited in claim 1, wherein:
the map data includes a multi-resolution voxel space; and
generating map data further comprises combining covariance matrixes of voxels at a coarser resolution prior to combining the covariance matrixes at a finer resolution.

7. The system as recited in claim 1, further comprising determining a location of a system within the physical environment based at least in part on the map data.

8. A method comprising:
receiving first data representative of a physical environment;
receiving second data representative of the physical environment;
iteratively (1) determining one or more of a translation or a rotation of the first data and (2) associating, based at least in part on the one or more of the translation or the rotation, the first data with a voxel space associated with the second data, until a threshold is met;
generating map data by generating a combined covariance matrix of a first voxel associated with the first data and a second voxel associated with the second data, wherein generating map data comprises:
determining a neighborhood associated with the second voxel;
identifying a set of voxels associated with the first data within the neighborhood, the set of voxels including the first voxel; and
selecting the first voxel based at least in part on the first voxel having a centroid closest to the second voxel in the voxel space; and
outputting the map data.

9. The method as recited in claim 8, wherein the threshold is associated with at least one of:
a magnitude in a change in a residual of a third voxel between a prior iteration and a current iteration;
a predetermined physical distance; or
a predetermined number of iterations.

10. The method as recited in claim 8, further comprising determining a location of a system within the physical environment based at least in part on the map data.

11. The method as recited in claim 8, wherein:
the voxel space is a multi-resolution voxel space; and
generating map data further comprises combining covariance matrixes of voxels at a coarser resolution prior to combining the covariance matrixes at a finer resolution.

12. The method as recited in claim 8, further comprising applying, for individual iterations, a scaling factor to at least one of the translation or the rotation.

13. The method as recited in claim 8, wherein the second data is stored map data.

14. One or more non-transitory computer-readable media storing instructions that, when executed, cause one or more processors to perform operations comprising:
receiving first data representative of a physical environment;
receiving second data representative of the physical environment;
iteratively (1) determining one or more of a translation or a rotation of the first data and (2) associating, based at least in part on the one or more of the translation or the rotation, the first data with a voxel space associated with the second data, until a threshold is met;
generating map data by generating a combined covariance matrix of a first voxel associated with the first data and a second voxel associated with the second data, wherein generating map data further comprises:
determining a neighborhood associated with the second voxel;
identifying a set of voxels associated with the first data within the neighborhood, the set of voxels including the first voxel; and
selecting the first voxel based at least in part on the first voxel having a centroid closest to the second voxel in the voxel space; and
outputting the map data.

15. The one or more non-transitory computer-readable media as recited in claim 14, wherein the threshold is associated with at least one of:
a predetermined physical distance; or
a predetermined number of iterations.

16. The one or more non-transitory computer-readable media as recited in claim 15, wherein the operations further comprises determining a location of a system within the physical environment based at least in part on the map data.

17. The one or more non-transitory computer-readable media as recited in claim 15, wherein pre-alignment threshold is a distance threshold in voxel space.

18. The one or more non-transitory computer-readable media as recited in claim 14, wherein:
the voxel space is a multi-resolution voxel space; and
generating map data further comprises combining covariance matrixes of voxels at a coarser resolution prior to combining the covariance matrixes at a finer resolution.

19. The one or more non-transitory computer-readable media as recited in claim 15, wherein the operations further comprises applying, for individual iterations, a scaling factor to at least one of the translation or the rotation.

20. The one or more non-transitory computer-readable media as recited in claim 14, wherein the threshold is associated with a magnitude in a change in a residual of a third voxel between a prior iteration and a current iteration.

* * * * *